(12) United States Patent
Franz et al.

(10) Patent No.: US 8,583,636 B1
(45) Date of Patent: Nov. 12, 2013

(54) SYSTEMS AND METHODS FOR DETERMINING A QUALITY OF PROVIDED ITEMS

(75) Inventors: Alexander Mark Franz, Palo Alto, CA (US); Monika H Henzinger, Corseaux (CH)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/275,981

(22) Filed: Oct. 18, 2011

Related U.S. Application Data

(63) Continuation of application No. 10/952,501, filed on Sep. 29, 2004, now Pat. No. 8,065,296.

(51) Int. Cl.
*G06F 17/30* (2006.01)
(52) U.S. Cl.
USPC ........... 707/723; 707/706; 707/713; 707/722; 707/736; 707/758; 707/781
(58) Field of Classification Search
USPC ......... 707/706, 713, 722, 723, 736, 758, 781, 707/999.003–7
See application file for complete search history.

(56) References Cited

U.S. PATENT DOCUMENTS

| | | | |
|---|---|---|---|
| 6,665,837 B1 | 12/2003 | Dean et al. | |
| 6,842,761 B2 | 1/2005 | Diamond et al. | |
| 2002/0046002 A1 | 4/2002 | Tang et al. | |
| 2002/0152033 A1 | 10/2002 | Beavis et al. | |
| 2002/0156791 A1 | 10/2002 | Nesamoney et al. | |
| 2003/0101286 A1 | 5/2003 | Kolluri et al. | |
| 2003/0115187 A1 | 6/2003 | Bode et al. | |
| 2004/0103090 A1* | 5/2004 | Dogl et al. | 707/3 |
| 2004/0220914 A1* | 11/2004 | Cheung et al. | 707/3 |
| 2005/0060311 A1 | 3/2005 | Tong et al. | |
| 2005/0071741 A1* | 3/2005 | Acharya et al. | 715/500 |
| 2005/0187915 A1 | 8/2005 | De Lury et al. | |
| 2005/0192936 A1* | 9/2005 | Meek et al. | 707/3 |
| 2006/0004732 A1 | 1/2006 | Odom | |
| 2006/0041550 A1* | 2/2006 | Bennett et al. | 707/5 |

OTHER PUBLICATIONS

Co-pending U.S. Appl. No. 10/952,501, filed Sep. 29, 2004 entitled "Systems and Methods for Determining a Quality of Provided Items", by Franz et al., 29 pages.
Beitzel et al., "Hourly Analysis of a Very Large Topically Categorized Web Query Log", Jul. 25-29, 2004, ACM Edition SIGIR'04, 8 pages.
Microsoft Computer Dictionary, p. 344, 5$^{th}$ Ed., 2002.

* cited by examiner

*Primary Examiner* — Syling Yen
(74) *Attorney, Agent, or Firm* — Harrity & Harrity, LLP

(57) ABSTRACT

A system may provide items during a time period and determine a quality of the items provided during the time period using a time series model.

20 Claims, 8 Drawing Sheets

SYSTEMS AND METHODS FOR DETERMINING A QUALITY OF PROVIDED ITEMS

RELATED APPLICATION

This application is a continuation of U.S. patent application Ser. No. 10/952,501, filed Sep. 29, 2004, the entire content of which is incorporated herein by reference.

FIELD OF THE INVENTION

Implementations consistent with the principles of the invention relate generally to providing items, and more specifically, to determining a quality of the provided items.

BACKGROUND OF THE INVENTION

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links.

In an attempt to increase the relevancy and quality of the web pages returned to the user, a search engine may attempt to sort the list of hits so that the most relevant and/or highest quality pages are at the top of the list of hits returned to the user. For example, the search engine may assign a rank or score to each hit, where the score is designed to correspond to the relevance or importance of the web page.

It may be desirable to monitor the quality of the search results provided to users in order to notice general trends of improving or declining quality and to identify specific problems that might suddenly cause a drop in quality. Manual evaluation of search quality can be laborious and time consuming, typically allowing for a small number of searches and search results to be evaluated to determine overall quality of a search engine.

SUMMARY OF THE INVENTION

In accordance with one implementation consistent with the principles of the invention, a method includes providing items during a time period and determining a quality of the items provided during the time period using a time series model.

In another implementation consistent with the principles of the invention, a system may include logic to provide a group of items over a time period; logic to record user behavior relating to providing the group of items; logic to predict user behavior for the time period; and logic to determine a quality of the plurality of items based on the recorded user behavior and the predicted user behavior.

In a further implementation consistent with the principles of the invention, a method may include providing a first plurality of items over time; recording a user action relating to providing the first plurality of items; creating a time series model based on the recorded user action; providing a second plurality of items over a time period; recording a user action relating to providing the second plurality of items for the time period; predicting a user action for the time period by applying the created time series model to a number of previous time periods; comparing the recorded user action to the predicted user action; and determining a quality of the second plurality of items provided over the time period based on the comparing.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

Implementations consistent with the invention provide feedback on the quality of items provided to users. In one implementation, the items include search results and/or advertisements. A metric that reflects the quality of the items provided to users is selected. When the items include search results, the metric may include, for example, the percentage of searches for which the highest ranking result (or one of the highest ranking results) is selected by users.

To check the quality of the items during a desired time point $t_{n+1}$, user behavior may be recorded during a training time period $t_n$, which includes time points $t_1, t_2, \ldots, t_n$. A model may be created for time period $t_n$ based on the selected metric and using the recorded user behavior. The model may then be used to predict the value of the metric for the next time point $t_{n+1}$ (i.e., the desired time point), along with a confidence interval. For example, if daily metric values are used, training data from 100 days (the training time period) might be used to predict the metric value for one time point, day 101. If the actual metric value for time point $t_{n+1}$ falls within the predicted confidence interval, the quality of the items provided during time point $t_{n+1}$ can be determined to be within expectations. If, on the other hand, the actual metric value falls outside the predicted confidence interval, the quality of the items provided during time point $t_{n+1}$ can be determined to be below expectations. In this way, quality of items provided to users can be automatically and quickly determined without manual intervention.

Exemplary System

Figure 1:
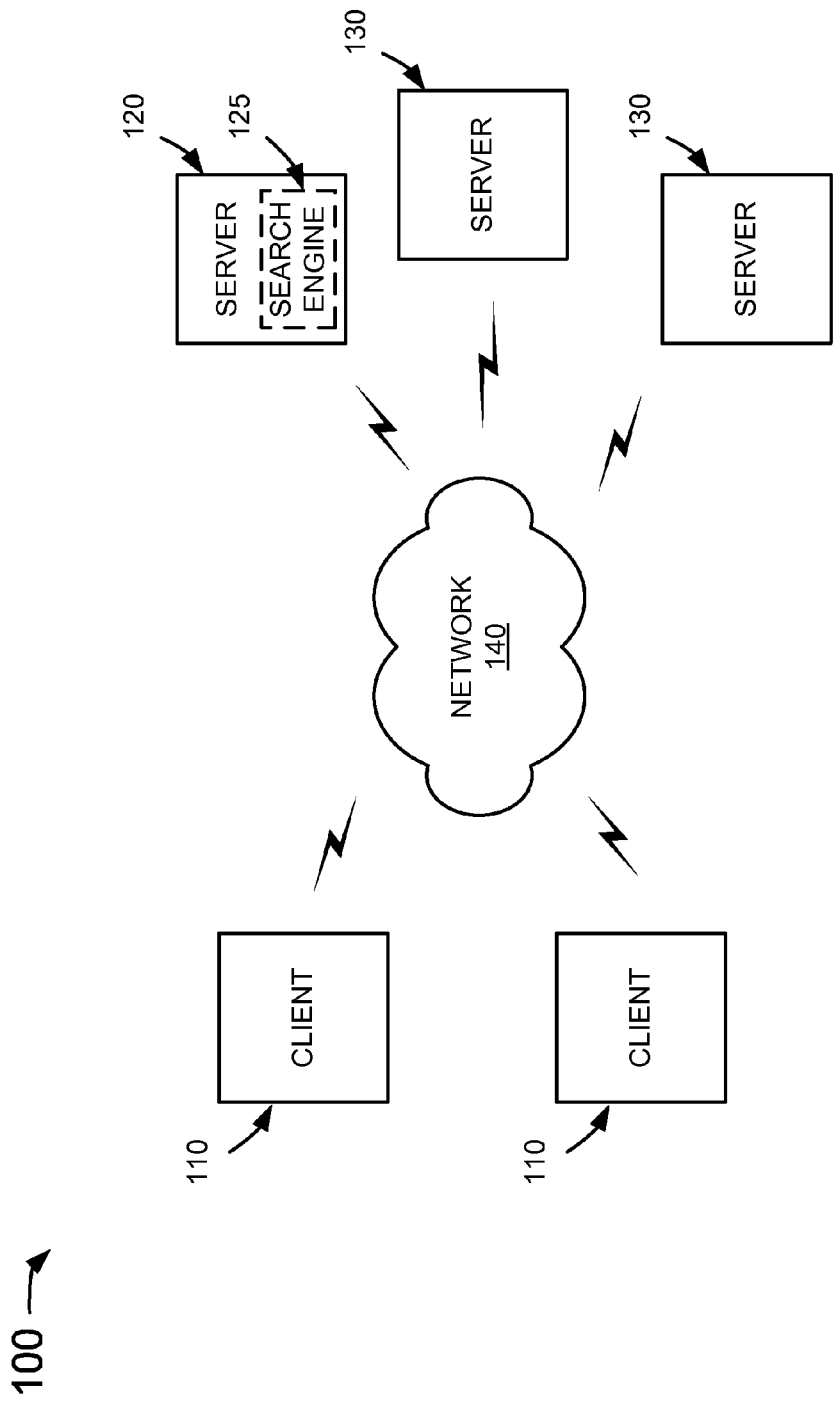
FIG. 1 is an exemplary diagram of a system in which systems and methods consistent with the principles of the invention may be implemented.

FIG. 1 is an exemplary diagram of a system 100 in which systems and methods consistent with the principles of the invention may be implemented. System 100 may include multiple clients 110 connected to servers 120 and 130 via a network 140. Network 140 may include a local area network (LAN), a wide area network (WAN), a telephone network, such as the Public Switched Telephone Network (PSTN), an intranet, the Internet, a similar or dissimilar network, or a combination of networks. Two clients 110 and three servers 120/130 have been illustrated as connected to network 140 in FIG. 1 for simplicity. In practice, there may be more or fewer clients 110 and/or servers 120/130. Also, in some instances, a client 110 may perform the functions of a server 120/130 and a server 120/130 may perform the functions of a client 110.

Clients 110 may include client entities. An entity may be defined as a device, such as a wireless telephone, a personal computer, a personal digital assistant (PDA), a lap top, or another type of computational or communication device, a thread or process running on one of these devices, and/or an object executable by one of these devices. Servers 120-130 may include server entities that gather, process, search, and/or maintain documents in a manner consistent with the principles of the invention. Clients 110 and servers 120-130 may connect to network 140 via wired, wireless, and/or optical connections.

In an implementation consistent with the principles of the invention, server 120 may optionally include a search engine 125 usable by clients 110. Server 120 may crawl documents (e.g., web pages) and store information associated with these documents in a repository of crawled documents. Servers 130 may store or maintain documents that may be crawled by server 120. While servers 120-130 are shown as separate entities, it may be possible for one or more of servers 120-130 to perform one or more of the functions of another one or more of servers 120-130. For example, it may be possible that two or more of servers 120-130 are implemented as a single server. It may also be possible that a single one of servers 120-130 is implemented as multiple, possibly distributed, devices.

Exemplary Server Configuration

Figure 2:
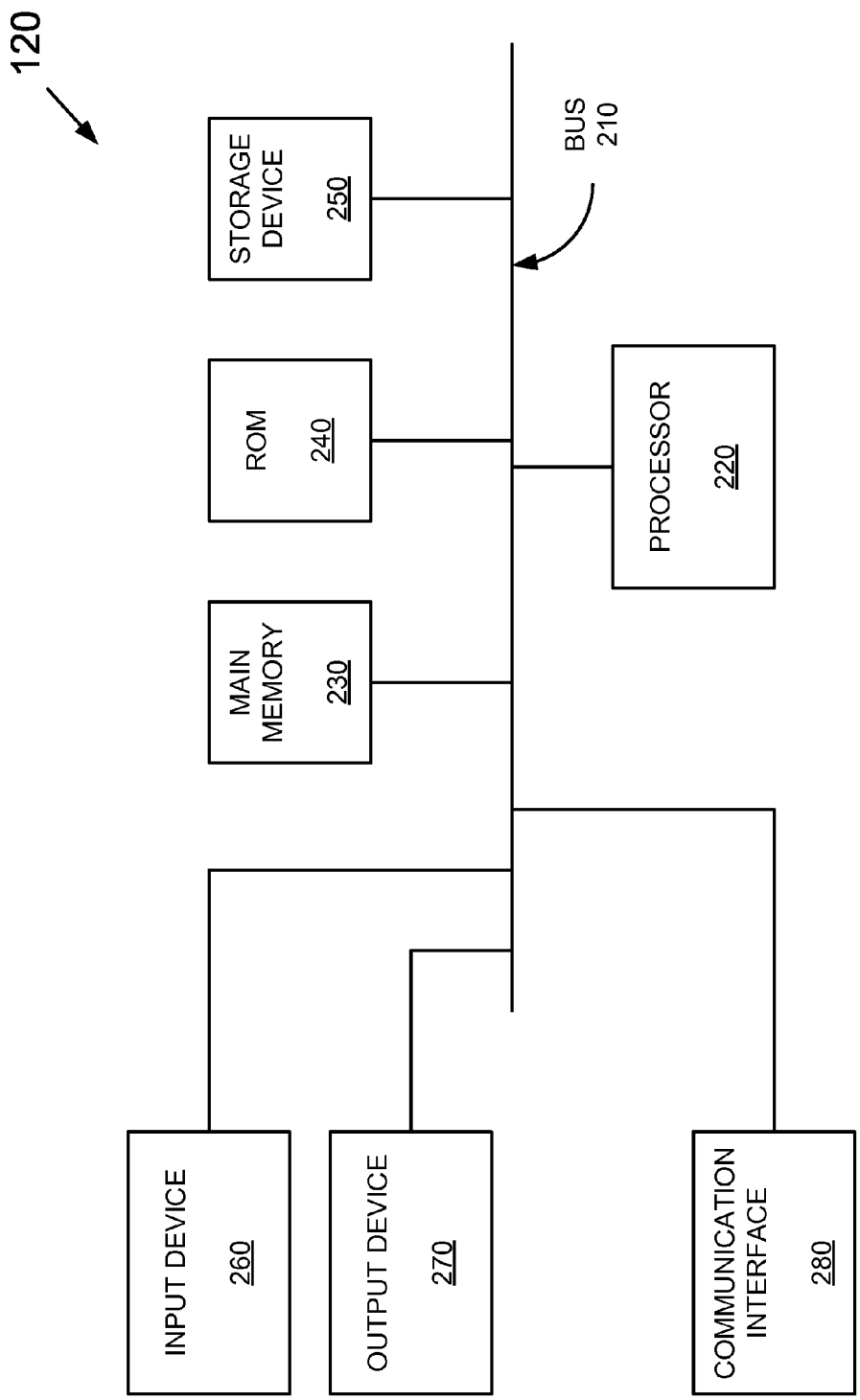
FIG. 2 is an exemplary diagram of a server of FIG. 1 in an implementation consistent with the principles of the invention.

FIG. 2 is an exemplary diagram of server 120 in an implementation consistent with the principles of the invention. Clients 110 and servers 130 may be similarly configured. Server 120 may include a bus 210, a processor 220, a main memory 230, a read only memory (ROM) 240, a storage device 250, an input device 260, an output device 270, and a communication interface 280. Bus 210 may permit communication among the components of server 120.

Processor 220 may include any type of conventional processor, microprocessor, or logic (e.g., a field programmable gate array, application specific integrated circuit, etc.) that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a mechanism that permits an administrator to input information to server 120, such as a keyboard, a mouse, a pen, a biometric mechanism, such as a voice recognition device, etc. Output device 270 may include a mechanism that outputs information to the administrator, including a display, a printer, a speaker, etc. Communication interface 280 may include any transceiver-like mechanism that enables server 120 to communicate with other devices and/or systems. For example, communication interface 280 may include mechanisms for communicating with another device or system via a network, such as network 140.

As will be described in detail below, server 120, consistent with the principles of the invention, may provide items to a client 110. Server 120 may perform these and other operations in response to processor 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary Processing

Figure 3:
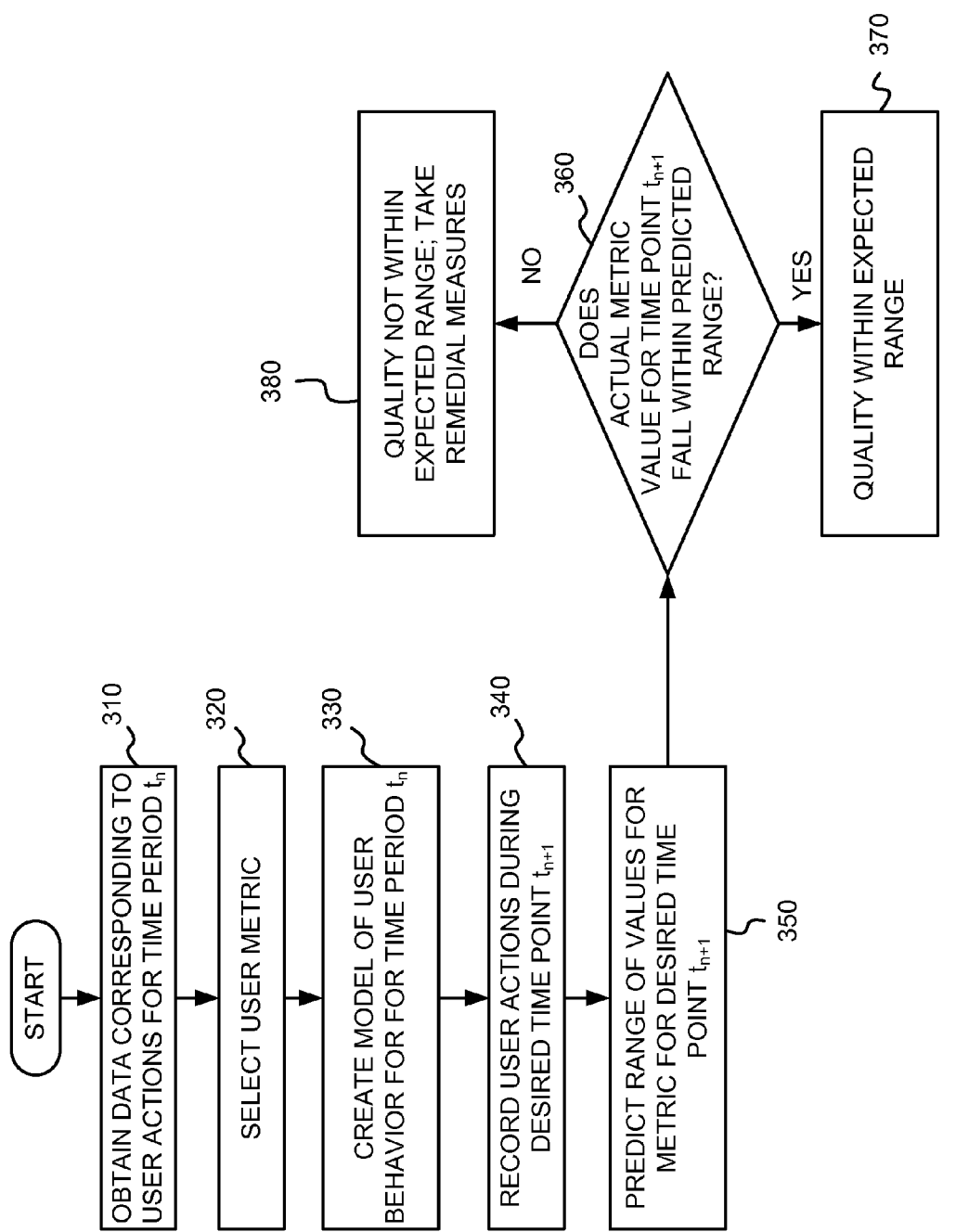
FIG. 3 is a flow chart of an exemplary process for determining a quality of items provided to a client in an implementation consistent with the principles of the invention.

FIG. 3 is a flow chart of an exemplary process for determining a quality of items provided to a client 110 in an implementation consistent with the principles of the invention. While the following description focuses on providing search results, it will be appreciated that implementations consistent with the principles of the invention are equally applicable to other types of items, besides search results. For example, implementations consistent with the principles of the invention are equally applicable to determining the quality of advertisements (or other items) provided to a client 110.

Processing may begin by obtaining data corresponding to user actions for a time period, $t_n$, which includes a series of time points $t_1, t_2, \ldots, t_n$ (act 310). In one implementation consistent with the principles of the invention, time period $t_n$ may include a time period where no major quality problems exist (e.g., a time period where quality is within an acceptable range). A metric may then be selected that reflects the quality of the search results (act 320). A metric is a measurement of user behavior and can include any user action that reflects the quality of the items (e.g., search results) provided to clients 110. The metric may include one user action or a combination of user actions, such as, for example, the percentage of searches in which the user selected the first result (or one of the top results) in the list of search results, the average first click position (i.e., the numerical position within the list of results), the percentage of searches that had long clicks (i.e., the percentage of times that a user selects a link to go to a result page and stays on that page for a long time, such as more than 3 minutes), the percentage of searches that did not have another search within a short period of time, the percentage of searches that did not have a reformulated search (i.e., a search where one or more search terms in the original search are added, deleted, or changed) within a short period of time, a combination of different metrics, and/or the like.

A time series model may be created for the time period $t_n$ based on the selected metric and using the data obtained in act 310 (act 330). Creating time series models is well known in the art and, thus, will not be described in further detail herewith. As will be appreciated, the time series model may reflect the trend and seasonality of the selected metric during the time periods in which the data is obtained. For example, the time series model can reflect patterns, such as user behavior on weekdays compared to user behavior on weekends, user behavior at night compared to user behavior during the day, user behavior on Mondays compared to user behavior on Tuesdays, user behavior on fixed or moving holidays, etc. One or more well-known techniques may be used to improve the time series model and identify trends and/or seasonality in the data, such as smoothing techniques, auto-correlation functions (ACFs) and/or partial auto-correlation functions (PACFs), etc.

User actions may be recorded for a desired time point $t_{n+1}$ (or series of time points) and an actual metric value for each time point may be determined (act 340). The time point $t_{n+1}$ may be configurable and may, for example, be a minute, an hour, a day, a month, a year, a combination of these time ranges, or other time ranges. A predicted metric value for time point $t_{n+1}$ may be determined (act 350). In one implementation, the time series model may be used to predict the metric value for time point $t_{n+1}$, along with a confidence interval. As will be appreciated, the confidence interval provides a range for the expected value of the metric for the time point $t_{n+1}$. The confidence interval may be some standard deviation (e.g., two standard deviations, three standard deviations, or the like) from the predicted metric value.

The actual value for the metric recorded during time point $t_{n+1}$ may then be compared to the confidence interval (or to the predicted metric value) (act 360). If the actual metric value for time point $t_{n+1}$ falls within the confidence interval (or is within a threshold of the predicted metric value), it may be determined that the quality of the items provided to clients 110 (e.g., the search results) is within expectations (act 370). A notification of such may optionally be provided to a system administrator located at server 120 or remotely from server 120.

If, on the other hand, the actual value for the metric recorded during time point $t_{n+1}$ falls outside the confidence interval (or is outside a threshold of the predicted metric value), then it may be determined that the quality of the items provided to clients 110 (e.g., the search results) is outside the expected range (act 380). In such an event, remedial measures may be taken (act 380). For example, a notification may optionally be provided to a system administrator located at server 120 or remotely from server 120. In addition or alternatively, the last change (or a recent change) made to server 120 may be automatically removed. For example, if a new index segment was added to server 120 and it is determined that the quality of search results associated with the new index segment falls outside the expected range, a notification of the quality can be provided to the system administrator and the new index segment may be automatically (or manually) removed. As another example, one or more recent changes may be automatically reverted, where a change could include a change in data, a change in programming code, etc.

The following example illustrates the above processing. Assume, for explanatory purposes, that the items are search results and the metric is selected as the percentage of searches that had a click on the first result.

Figure 4:
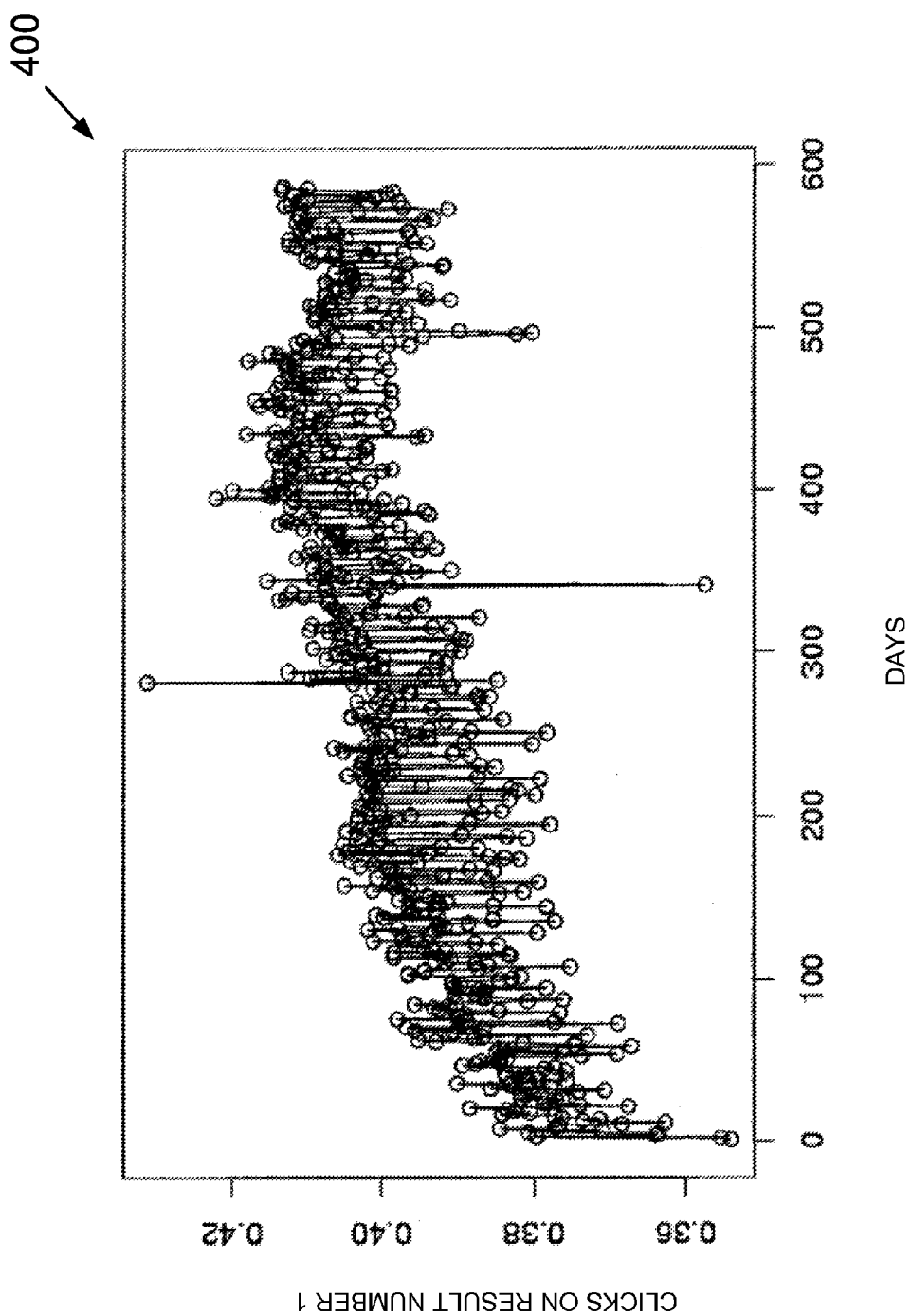
FIG. 4 depicts an exemplary time series model that may be created in an implementation consistent with the principles of the invention.

FIG. 4 depicts an exemplary time series model 400 that may be created in an implementation consistent with the principles of the invention. As illustrated, model 400 graphs the percentage of selections (or clicks) on the first result obtained in response to providing search results over a six hundred day period. As indicated above, model 400 may be created from data obtained during those times when no major quality problems exist. In this way, time series model 400 may reflect normal user behavior. Model 400 shows a significant amount of local variation, some long-term trends, and some outliers (data points that lie far outside the rest of the data points).

Figure 5:
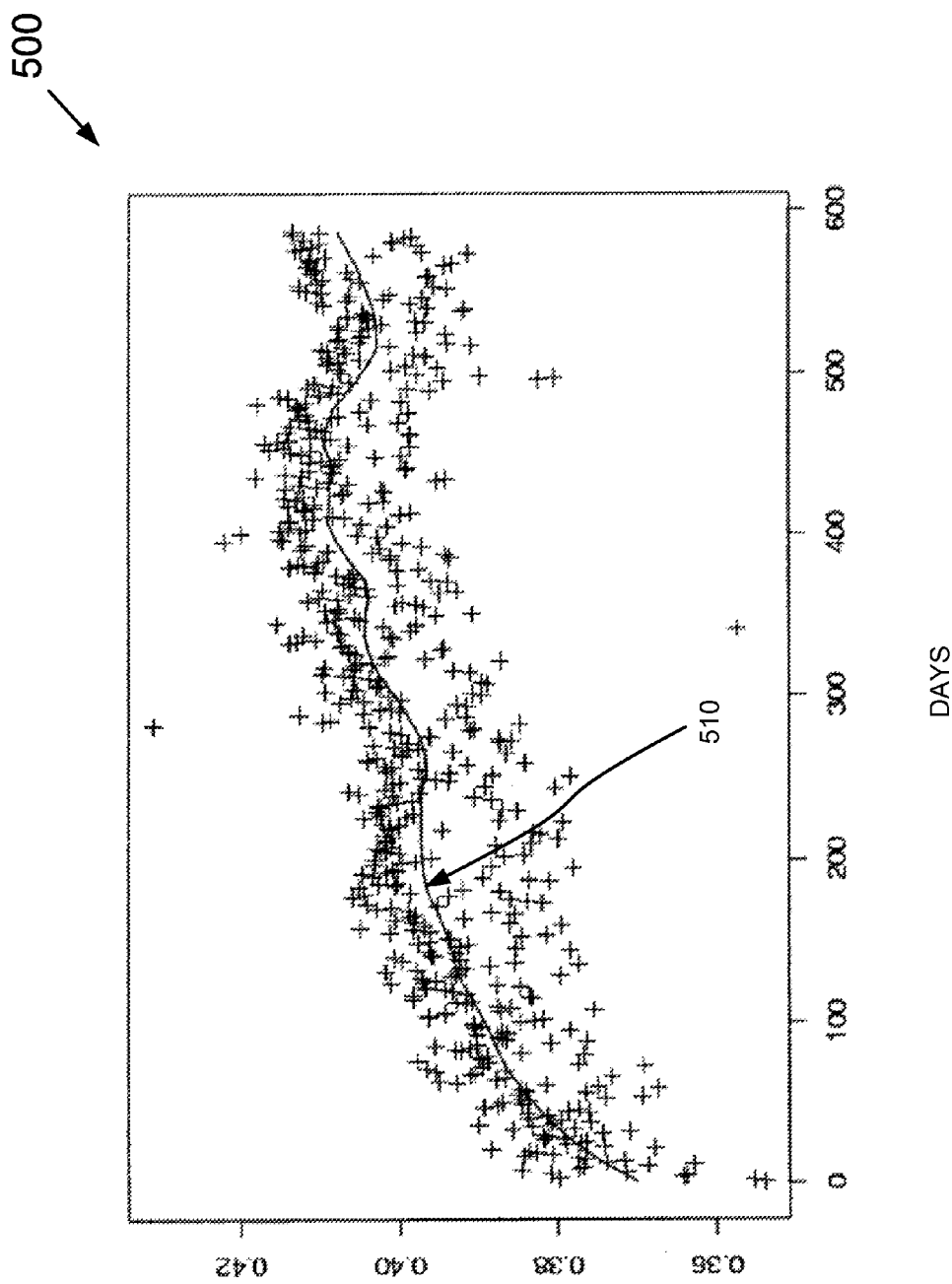
FIG. 5 depicts the time series model of FIG. 4 after smoothing has been applied in an implementation consistent with the principles of the invention.

Time series model 400 may be improved using a smoothing technique (or other techniques). For example, a fitted line 510 may be obtained from the data in model 400, as illustrated in the exemplary graph 500 depicted in FIG. 5. In one implementation, fitted line 510 may be obtained using Loess smoothing or other techniques.

Figure 6:
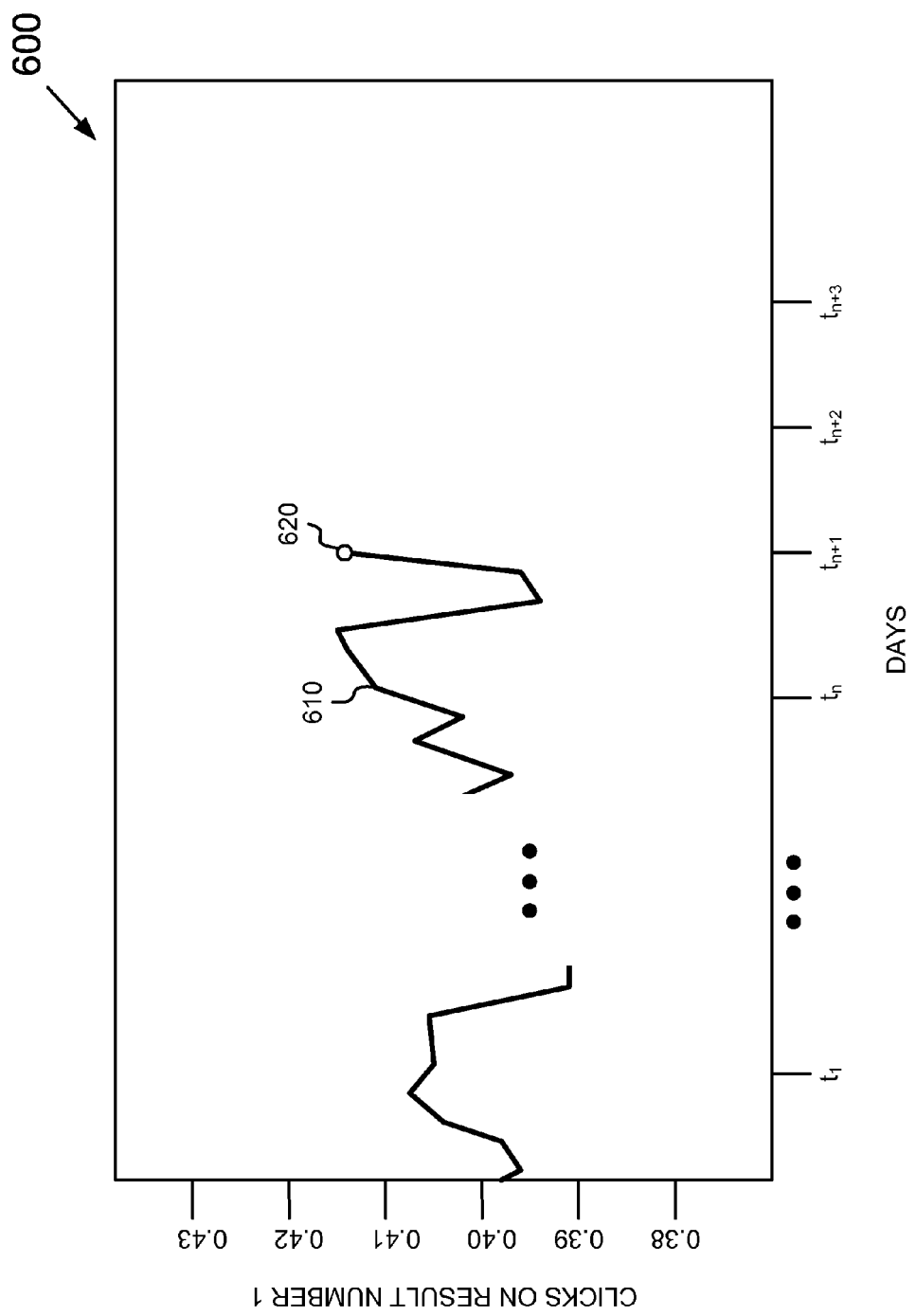
FIG. 6 depicts an exemplary graph of recorded user behavior in an implementation consistent with the principles of the invention.

Turning to FIG. 6, assume that the time point for which quality is to be checked is $t_{n+1}$. As illustrated in FIG. 6, user behavior may be recorded for a time period $t_1$ through $t_{n+1}$, and a fitted line 610 obtained. Point 620 represents the percentage of actual users selecting the first result obtained in response to search results provided during time period $t_{n+1}$.

Figure 7:
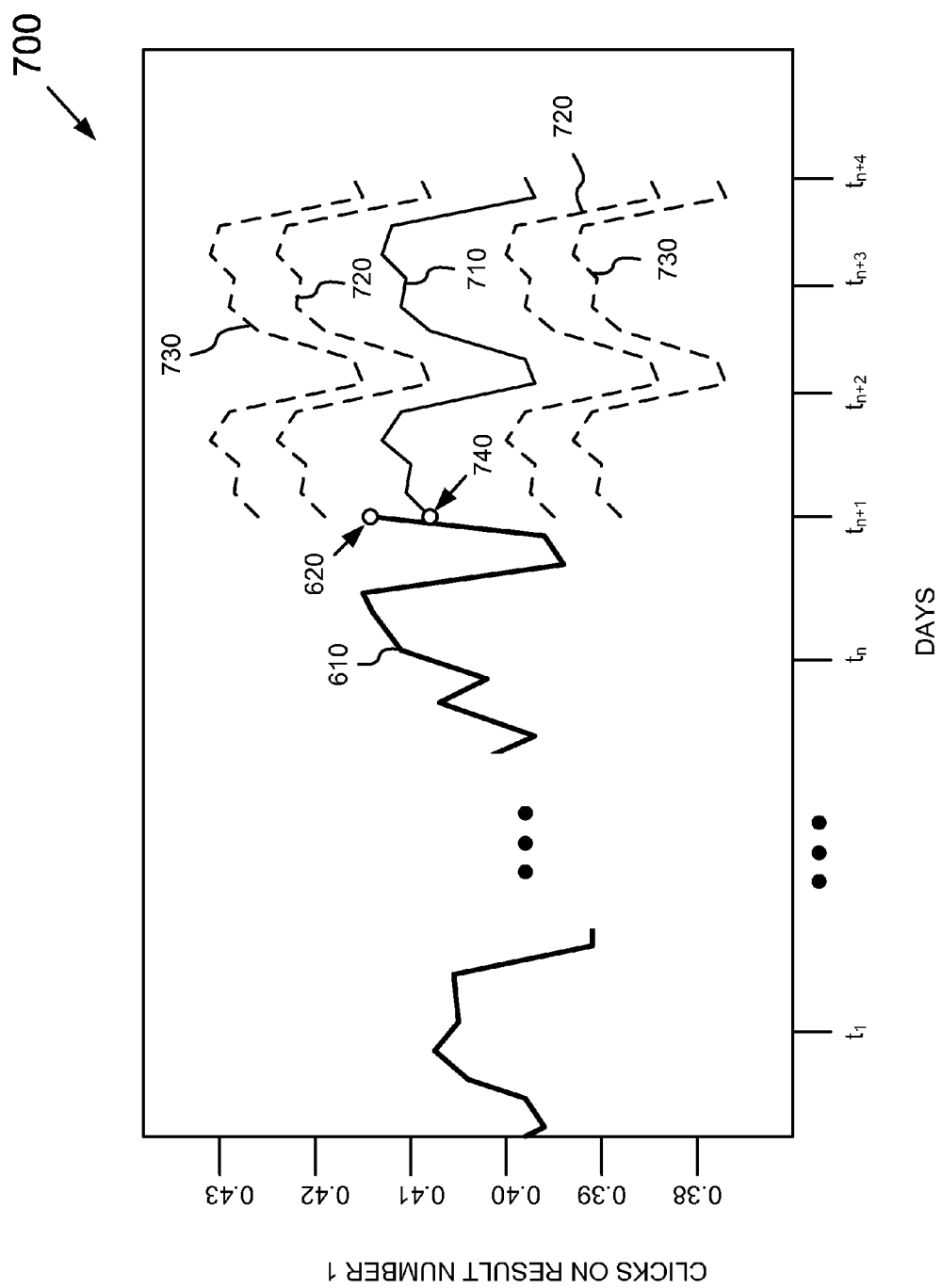
FIG. 7 depicts an exemplary graph showing predicted user behavior and confidence intervals in an implementation consistent with the principles of the invention.

A time series model, such as time series model 400, may be used to predict user behavior for the desired time point $t_{n+1}$. FIG. 7 illustrates an exemplary graph 700 in an implementation consistent with the principles of the invention. Line 710 represents the predicted user behavior for time points $t_{n+1}$ through $t_{n+4}$. Dotted lines 720 are a distance of two standard deviations from the predicted values 710. Lines 720 may represent a 95% confidence interval. Variations between line 710 and line 720 may be considered to be not statistically significant. Dotted lines 730 are a distance of three standard deviations from the predicted values 710. Lines 730 may represent a 99.7% confidence interval. If a data point falls outside dotted line 730, this may indicate that quality is below expectations and that remedial measures should be taken. In the example illustrated in FIG. 7, point 740 illustrates the predicted value of user behavior for time point $t_{n+1}$. As illustrated, point 740 falls within dotted lines 730 and, therefore, indicates that quality is within expectations for time point $t_{n+1}$.

Figure 8:
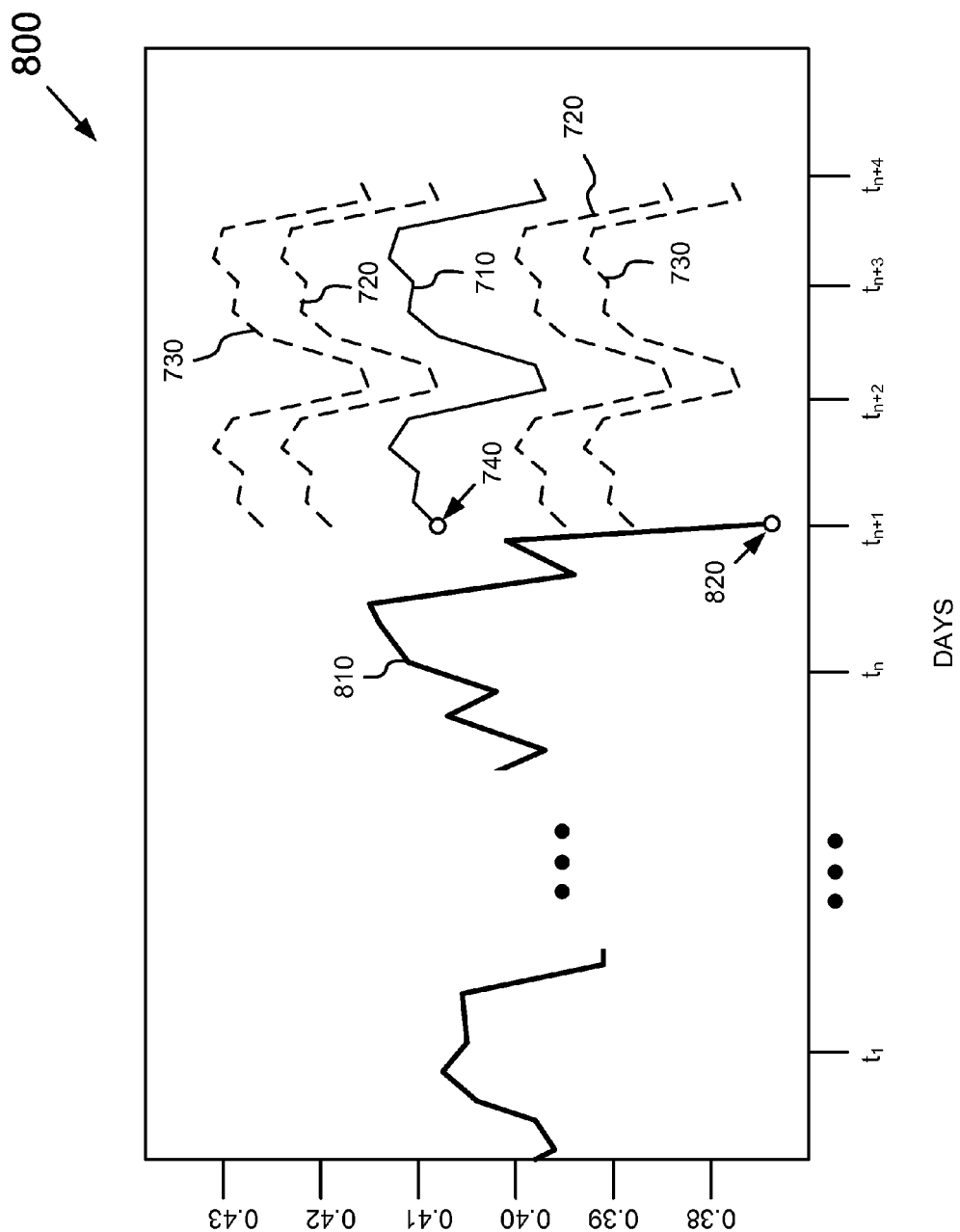
FIG. 8 depicts a graph showing recorded user behavior, predicted user behavior, and confidence intervals in an exemplary implementation consistent with the principles of the invention.

As another example, assume that line 810 represents user behavior recorded for points $t_1$ through $t_{n+1}$, as illustrated in FIG. 8. In FIG. 8, point 820 represents the percentage of users selecting the first result obtained in response to providing search results during time point $t_{n+1}$.

A time series model, such as time series model 400, may be used to predict user behavior for the desired time point $t_{n+1}$ and lines 710-730 may be obtained in a manner similar to the example described above with respect to FIGS. 6 and 7. In this example, data point 820 (the actual percentage of users that selected the first result during time point $t_{n+1}$) falls outside dotted line 730, indicating that quality is below expectations and that remedial measures should be taken. As set forth above, the remedial measures may include, for example, notifying a system administrator that the quality is below expectations or automatically removing (or reverting) a change made to server 120.

CONCLUSION

Implementations consistent with the principles of the invention may determine a quality of items provided by a device.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, one or more of the acts described with respect to FIG. 3 may be performed by server 120 or another device (or combination of devices). In one implementation, one or more of the acts described with respect to FIG. 3 may be performed by a client 110 or a server, such as one of servers 130. In addition, a browser assistant (i.e., client-based software that operates in conjunction with a conventional web browser) may perform one or more of the acts described with respect to the processing of FIG. 3.

While a series of acts has been described with regard to FIG. 3, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
generating, by one or more processors, one or more values based on a measure of quality of first search results provided during a first time period and based on a first search query,
the one or more values corresponding to a predicted measure of quality of one or more second search results,
the one or more second search results being provided during a second time period and being based on a second search query,
the second time period being subsequent to the first time period, and
the one or more values being based on one or more user actions associated with the first search results provided during the first time period;
providing, by one or more processors, a list of the one or more second search results during the second time period;
determining, by one or more processors, an actual measure of quality of the one or more second search results in the list of the one or more second search results provided during the second time period;
comparing, by one or more processors, the predicted measure of quality to the actual measure of quality; and
taking, by one or more processors, one or more remedial measures when the actual measure of quality is outside of a range of the predicted measure of quality.

2. The method of claim 1, where the actual measure of quality is based on at least one of:
a percentage of times that a particular search result, in the list of the one or more second search results, is selected,
an average position of a search result that is selected first within the list of the one or more second search results,
a percentage of searches that did not have another search performed within a particular period of time, or
a percentage of searches that did not have a reformulated search performed within another particular period of time.

3. The method of claim 1, where the actual measure of quality is based on a percentage of times that a search result, in a top position in the list of the one or more second search results, is selected.

4. The method of claim 1, where the actual measure of quality is based on a percentage of times that a user stays on a page, associated with a search result in the list of the one or more second search results, for at least a predetermined amount of time.

5. The method of claim 4, where the predetermined amount of time is greater than three minutes.

6. The method of claim 1, where the actual measure of quality is determined using a time series model.

7. The method of claim 1, where the one or more remedial measures include at least one of:
removing an index segment used by the one or more processors to provide the list of the one or more second search results,
automatically removing a modification associated with the one or more processors, or
sending a notification.

8. A device comprising:
a memory containing instructions; and
a processor that executes the instructions to:
generate one or more values based on a measure of quality of first search results provided during a first time period and based on a first search query,
the one or more values corresponding to a predicted measure of quality of one or more second search results,
the one or more second search results being provided during a second time period and being based on a second search query,
the second time period being subsequent to the first time period, and
the one or more values being based on one or more user actions associated with the first search results provided during the first time period;
provide a list of the one or more second search results during the second time period;
determine an actual measure of quality of the one or more second search results in the list of the one or more second search results provided during the second time period;

compare the predicted measure of quality to the actual measure of quality; and take one or more remedial measures when the actual measure of quality is outside a range of the predicted measure of quality.

9. The device of claim 8, where the actual measure of quality is based on at least one of:

a percentage of times that a particular search result, in the list of the one or more second search results, is selected, an average position of a search result that is selected first within the list of the one or more second search results, a percentage of searches that did not have another search performed within a particular period of time, or a percentage of searches that did not have a reformulated search performed within another particular period of time.

10. The device of claim 8, where the actual measure of quality is based on a percentage of times that a search result, in a top position in the list of the one or more second search results, is selected.

11. The device of claim 8, where the actual measure of quality is based on a percentage of times that a user stays on a page, associated with a search result in the list of the one or more second search results, for at least a predetermined amount of time.

12. The device of claim 11, where the predetermined amount of time is greater than three minutes.

13. The device of claim 8, where the actual measure of quality is determined using a time series model.

14. The device of claim 8, where the one or more remedial measures include at least one of:

removing an index segment used by the processor to provide the list of the one or more second search results, automatically removing a modification associated with the processor, or sending a notification.

15. A non-transitory computer-readable medium storing instructions, the instructions comprising:

one or more instructions which, when executed by at least one processor, cause the at least one processor to generate one or more values based on a measure of quality of first search results provided during a first time period and based on a first search query, the one or more values corresponding to a predicted measure of quality of one or more second search results, the one or more second search results being provided during a second time period and being based on a second search query, the second time period being subsequent to the first time period, and the one or more values being based on one or more user actions associated with the first search results provided during the first time period;

one or more instructions which, when executed by the at least one processor, cause the at least one processor to provide a list of the one or more second search results during the second time period;

one or more instructions which, when executed by the at least one processor, cause the at least one processor to determine an actual measure of quality of the one or more second search results in the list of the one or more second search results provided during the second time period;

one or more instructions which, when executed by the at least one processor, cause the at least one processor to compare the predicted measure of quality to the actual measure of quality; and one or more instructions which, when executed by the at least one processor, cause the at least one processor to take one or more remedial measures when the actual measure of quality is outside a range of the predicted measure of quality.

16. The non-transitory computer-readable medium of claim 15, where the actual measure of quality is based on at least one of:

a percentage of times that a particular search result, in the list of the one or more second search results, is selected, an average position of a search result that is selected first within the list of the one or more second search results, a percentage of searches that did not have another search performed within a particular period of time, or a percentage of searches that did not have a reformulated search performed within another particular period of time.

17. The non-transitory computer-readable medium of claim 15, where the actual measure of quality is based on a percentage of times that a search result, in a top position in the list of the one or more second search results, is selected.

18. The non-transitory computer-readable medium of claim 15, where the actual measure of quality is based on a percentage of times that a user stays on a page, associated with a search result in the list of the one or more second search results, for at least a predetermined amount of time, where the predetermined amount of time is greater than three minutes.

19. The non-transitory computer-readable medium of claim 15, where the actual measure of quality is determined using a time series model.

20. The non-transitory computer-readable medium of claim 15, where the one or more remedial measures include at least one of:

removing an index segment used by the at least one processor to provide the list of the one or more second search results, automatically removing a modification associated with the at least one processor, or sending a notification.

* * * * *